(12) United States Patent
Ghaffar et al.

(10) Patent No.: US 10,776,886 B2
(45) Date of Patent: Sep. 15, 2020

(54) TIMING SOCIAL MEDIA NETWORK ACTIONS

(71) Applicant: INTERNATIONAL BUSINESS MACHINES CORPORATION, Armonk, NY (US)

(72) Inventors: Faisal Ghaffar, Dunboyne (IE); Teodora S. Buda, Dublin (IE); Hitham Ahmed Assem Aly Salama, Dublin (IE); Bora Caglayan, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 126 days.

(21) Appl. No.: 16/183,870

(22) Filed: Nov. 8, 2018

(65) Prior Publication Data

US 2020/0151826 A1    May 14, 2020

(51) Int. Cl.
*G06Q 50/00* (2012.01)
*G06Q 30/02* (2012.01)

(52) U.S. Cl.
CPC ......... *G06Q 50/01* (2013.01); *G06Q 30/0202* (2013.01)

(58) Field of Classification Search
None
See application file for complete search history.

(56) References Cited

U.S. PATENT DOCUMENTS

| | | | |
|---|---|---|---|
| 9,031,888 B2 | 5/2015 | Lawrence et al. | |
| 9,224,095 B2 | 12/2015 | Booth et al. | |
| 9,632,972 B1 | 4/2017 | Moxley et al. | |
| 2013/0117364 A1 | 5/2013 | Bania et al. | |
| 2013/0159507 A1* | 6/2013 | Mason | G06Q 10/10 709/224 |
| 2013/0254283 A1 | 9/2013 | Garcia-Martinez et al. | |
| 2013/0346147 A1 | 12/2013 | Vellozo Luz et al. | |
| 2014/0006493 A1 | 1/2014 | Balakrishnan | |

(Continued)

OTHER PUBLICATIONS

Y. Bi, W. Wu and Y. Zhu, "CSI: Charged System Influence Model for Human Behavior Prediction," 2013 IEEE 13th International Conference on Data Mining, Dallas, TX, 2013, pp. 31-40, doi: 10.1109/ICDM.2013.136. (Year: 2013).*

(Continued)

*Primary Examiner* — Mehmet Yesildag
(74) *Attorney, Agent, or Firm* — Rakesh Roy

(57) ABSTRACT

A method, computer system, and a computer program product for improving social media network actions is provided. The present invention may include determining a proposed action by a user and predicting a predicted influence score for the proposed action. The present invention may include identifying a prior related action in the user's social media network. The present invention may include retrieving a previously calculated average influence score for the type and user of the prior related action and applying a decay profile to the average influence score from the time of the action to a current time. The present invention may include comparing the predicted influence score with the decayed average influence score at the current time. The present invention may include posting the proposed action on the social media network at a time when the predicted influence score is greater than the decayed average influence score.

13 Claims, 9 Drawing Sheets

(56) References Cited

U.S. PATENT DOCUMENTS

| | | | |
|---|---|---|---|
| 2014/0019539 A1 | 1/2014 | Novak et al. | |
| 2014/0122503 A1* | 5/2014 | Smith | G06F 16/93 707/748 |
| 2014/0293810 A1* | 10/2014 | Nema | H04L 45/12 370/252 |
| 2017/0277691 A1* | 9/2017 | Agarwal | H04W 4/21 |
| 2019/0394289 A1* | 12/2019 | Lehrian | H04L 67/322 |

OTHER PUBLICATIONS

Dave et al., "Identifying Influencers in Social Networks," The International Conference on Weblogs and Social Media, 2011, 9 Pages, Association for the Advancement of Artificial Intelligence.

Ghosh et al., "Predicting Influential Users in Online Social Networks," Proceedings of KDD workshop on Social Network Analysis (SNA-KDD), 2010, 10 Pages.

Goyal et al., "Learning Influence Probabilities in Social Networks," WSDM'10, Feb. 4-6, 2010, p. 241-250, ACM, New York City, New York, USA.

Mell et al., "The NIST Definition of Cloud Computing," National Institute of Standards and Technology, Sep. 2011, p. 1-3, Special Publication 800-145.

Subbian et al., "Supervised Rank Aggregation for Predicting Influence in Networks," arXiv.org Computer Science, Aug. 25, 2011, 8 Pages.

\* cited by examiner

TIMING SOCIAL MEDIA NETWORK ACTIONS

STATEMENT REGARDING SPONSORED RESEARCH OR DEVELOPMENT

The project leading to this application has received funding from the European Union's Horizon 2020 research and innovation program under Grant Agreement No. 688127.

BACKGROUND

The present invention relates generally to the field of computing, and more particularly to social media networks.

In many social media networks, a particular user may perform actions that can be viewed by his social contacts. Some actions performed on the social media network may influence some of the user's social contacts and they may perform similar actions. As an action propagates, the influence increases and reaches a peak value and from there the influence starts declining and decays over time.

As an example, a first user may use a social media networking site relating to movies to perform the action of rating and/or reviewing a movie. This action may then be viewed by the first user's social contacts and some of them may be interested in performing similar actions (reviewing/rating the same movie). The first user may be said to have influenced actions performed by the first user's social contacts and such actions may further propagate to contacts of users' contacts.

During a time of a peak of influence of a particular action, if another user performs a similar action, the influence of the similar action will be undermined by the influence of the action that triggered it.

In such scenarios, timing of performance of an action by a user plays a significant role in propagating the influence.

SUMMARY

Embodiments of the present invention disclose a method, computer system, and a computer program product for improving influence of social media network actions. The present invention may include determining a proposed action by a user of a type of action and predicting a predicted influence score for the proposed action. The present invention may then include identifying a prior related action in the user's social media network including a type of the action, a user of the action, and a time of the action. The present invention may also include retrieving a previously calculated average influence score for the type and user of the prior related action and applying a decay profile to the average influence score from the time of the action to a current time. The present invention may further include comparing the predicted influence score with the decayed average influence score at the current time. The present invention may include posting the proposed action on the social media network at a time when the predicted influence score is greater than the decayed average influence score.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. For example, the dimensions of some of the elements may be exaggerated relative to other elements for clarity. Further, where considered appropriate, reference numbers may be repeated among the figures to indicate corresponding or analogous features. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

A method and a system are described for improving influence of social media network actions of users. The method suggests a delay in posting an action by a user on a social media network with the intent of improving the influence of that action. An action may be a post such as a blog, update or comment, including text and/or other media such as photographs, images and video, etc.

Methods to measure influence of actions in social media networks are known in the prior art. This method suggests a delay in a proposed action based on a current influence of a neighboring or related action. By continuously checking and waiting until a neighboring or related action has a decayed influence below a threshold, the proposed action is held and posted at a time of most probable influence.

The method identifies a "right time" for performing an action on the social media network, which is considered a point in time when the action will have an influence higher than the maximum influence of a similar action already propagating on the network. The method calculates an average influence score for each of different types of actions performed by a user or the contacts of the user on the social media network. The system then predicts an influence score of a proposed action a user of a social media network is about to perform. If the predicted influence score is less than the highest influence score of related actions performed by contacts of the user, the action is held until influence score becomes larger at a point in future.

The predicted influence score of a user's action may be displayed to the user for the user's awareness.

Figure 1:
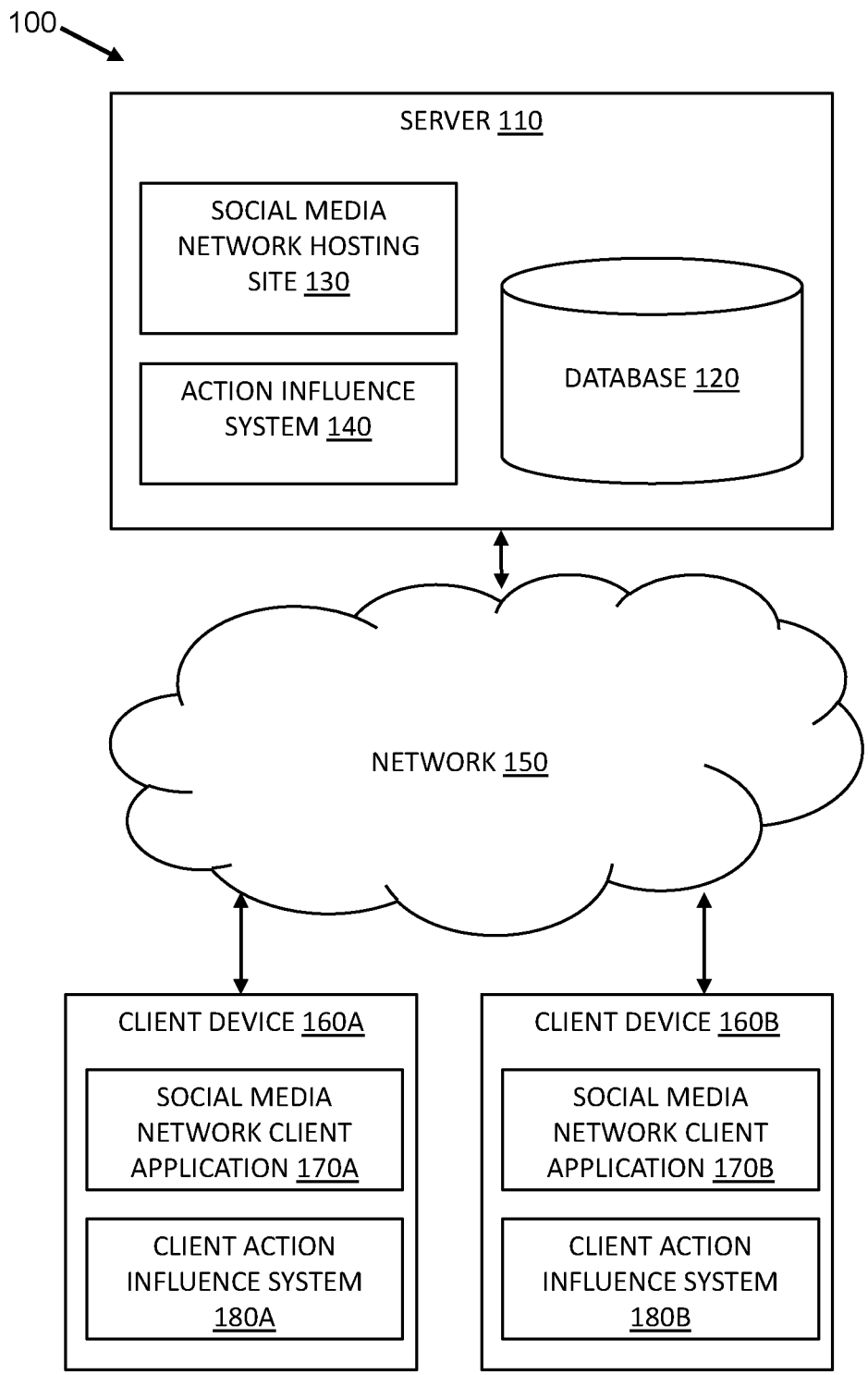
FIG. 1 illustrates a block diagram of a system in which the present invention may be implemented according to at least one embodiment.

Referring to FIG. 1, a block diagram shows an example embodiment of a system 100 in which the described method and system may be implemented. A server 110 may provide a social media network hosting site 130 including a database 120 providing data for the social media network hosting site 130. The social media network hosting site 130 may provide a social media network via a communication network 150 to a plurality of client devices 160A, 160B. The client devices 160A, 160B may include social media network client applications 170A, 170B for interaction with the social media network hosting site 130.

The described system provides an action influence system 140 that may integrated or used in association with a social media network hosting site 130 with client action influence systems 180A, 180B provided at the client devices 160A, 160B integrated with or associated with the social media network client applications 170A, 170B.

Figure 2:
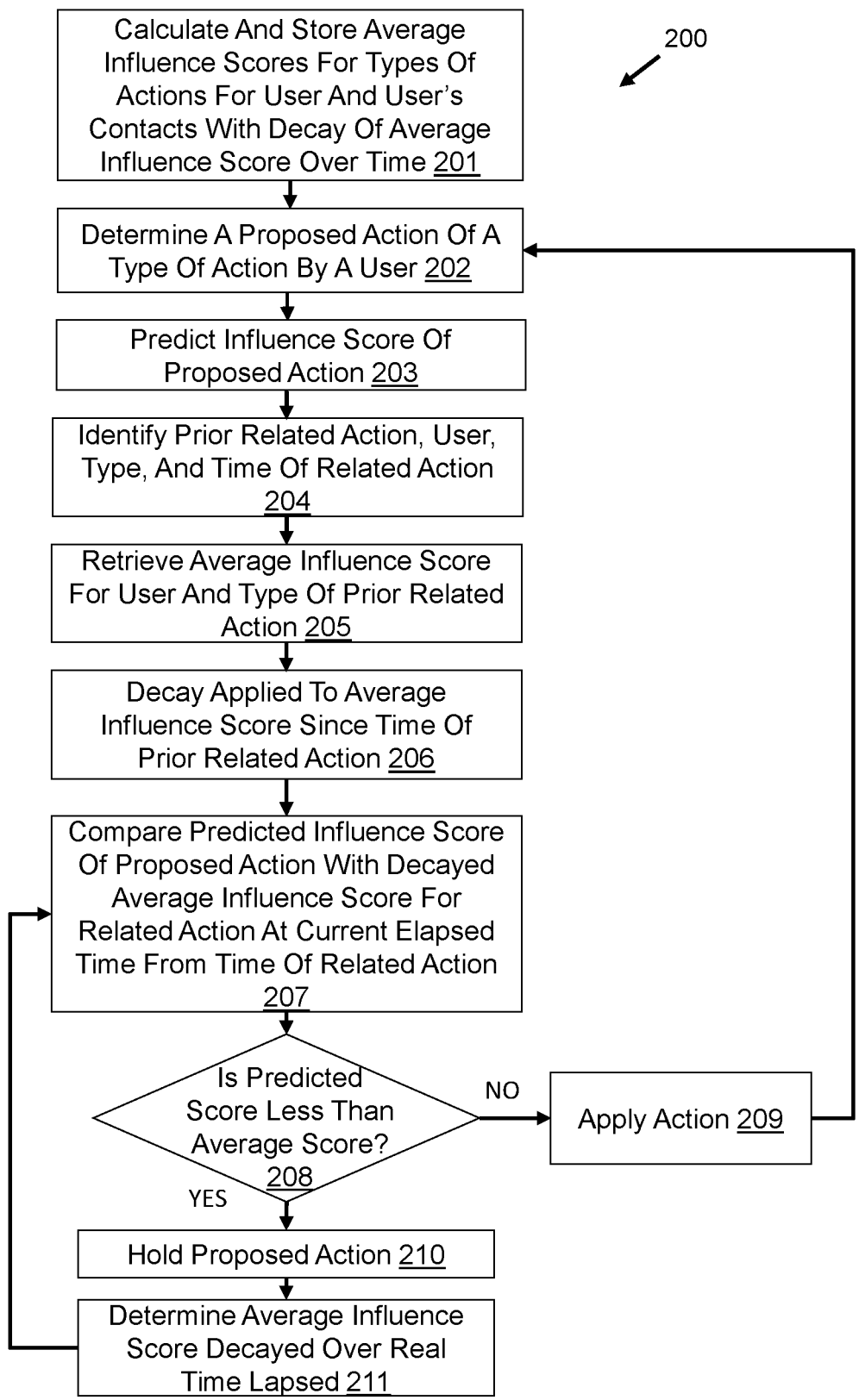
FIG. 2 is an operational flowchart illustrating a process for the present invention according to at least one embodiment.

Referring to FIG. 2, an operational flowchart illustrating the exemplary process 200 for improving influence of social media network actions according to at least one embodiment is depicted. The process 200 may be carried out by interaction of a client action influence system 180A, 180B and an action influence system 140 at a host server.

At 201, average influence scores for types of actions are calculated and stored for a user and the user's contacts in a social media network with a decay of the average influence score over time.

The average influence score is calculated for actual posts as carried out by a user and as carried out by the user's contacts. Over a period of time, an average influence score may be calculated and stored for each action type performed by the user and/or the user's contacts.

The influence score may be calculated by various techniques and may be based on one or more of the following social media network statistics or factors:
- the number of times the action or a derivative action is performed by contacts of the user after the performance of the action by the user;
- the frequency of performance of the action or a derivative by contacts of the user,
- the influence scores for the action of contacts of the user, and/or
- the time that subsequent actions or derivative actions by a user's contacts are performed after the initial performance of the action by the user.

The average influence score may be a single score per action type per user over a period of time. This period may be for the period since the user joined the social media network or any configurable period of time. Influence associated with a user in the social media network is based on actions the user performs over any given period of time.

The average influence scores for a user and the user's contacts in a social media network for a type of action may be stored in a database together with a decay profile over time.

In social media networks, it is natural that contacts of a user may be influenced by an action performed by the user and this influence may be maximum at the start but may not stay constant with time. Therefore, an influence of a user due to performing a certain action may start decaying with time. In one embodiment, the decay profile may include an exponential decay.

The calculation and storage of the average influence scores may be carried out at the action influence system 140 at the server 110 and maintained in a database 120 associated with a social media network hosting site 130. This calculation may be updated over a configured period of time for the users.

Then, at 202, determine that an action is proposed by the user and identify the type of action that is proposed.

Then, at 203, predict influence score of the proposed action. Analysis may predict the predicted influence score for the user based on performing the proposed action type.

The predicted influence score may be generated by linear threshold models or an independent cascade model that may approximate influence propagation between users in the social media network. These models may assume that there already exists influence probabilities between users. Influence probabilities may be learned from action logs of the users.

A first class of the model is a static model, which assumes probabilities between users are static and do not change over time. A second class of the model is a continuous time model, which assumes influence probabilities as a continuous function of time. One approximation of a continuous time model is a discrete time-based model. A generic cascade model for influence finds a small number of vertices in a social media network $G(V,E)$ such that the expected number of vertices influenced by seeds is the largest possible.

Such approximation models can learn jointly the influence probabilities of users based on one user performing an action and other user performing the same action at a later stage in time while both users are connected via a link in the social media network.

Then, at 204, a prior related action is identified that is related to the proposed action. A performance time of the prior related action, a prior user who performed the related action, and the action type of the related action are also identified. The related action may be a same type of action as the proposed action, for example, both movie reviews. In another case, the related action may be a different but related type of action, for example, a post that the proposed action comments on. The prior user who made the prior related action may be the same user who is intending to make the proposed action or may be a contact in the user's social media network.

Then, at 205, the stored average influence score for the user and type of action of the prior related action are retrieved. Next, at 206, a decay is applied to average influence score from the posting time of the prior related action.

Then, at 207, the predicted influence score of the proposed action is compared to the decayed stored average influence score for the prior related action.

Then, at 208, an inquiry is made to determine if the predicted influence score is less than the decayed average influence score of the related action. If the predicted influence score is greater than the decayed average influence score, then at 209, the proposed action may be applied at this time.

However, if the predicted influence score is less than the decayed average influence score of the related action, then at 210, the proposed action may be held and not posted at this time.

Next, at 211, as time elapses in real time, the decay of the average influence score of the related action is determined and the process 200 may loop to 207 to compare the predicted influence score with the further decayed average influence score. This may repeat until the average influence score for the related action has decayed sufficiently for the predicted scored to be greater than the decayed average influence score and for the proposed action to be posted 209. This ensures that the proposed action has a greater influence than the prior related action at the time of posting the proposed action.

The process 200 may monitor the influence of a particular related action (e.g., similar type or related type as the proposed action) that is being propagated on the social media network and may continuously calculate the decayed influence of the particular related action until the influence of the particular related action is lower than the predicted influence of proposed action.

The process 200 may be carried out for multiple prior related actions by the same or different users in order to apply the action at 209 when the predicted score is greater than all the average scores of the prior related actions.

The process 200 may display the predicted influence score of a user's action to the user. The predicted influence score of the user's action may be displayed with a display graphic indicating the decaying influence of prior related actions of other users.

Figure 3A:
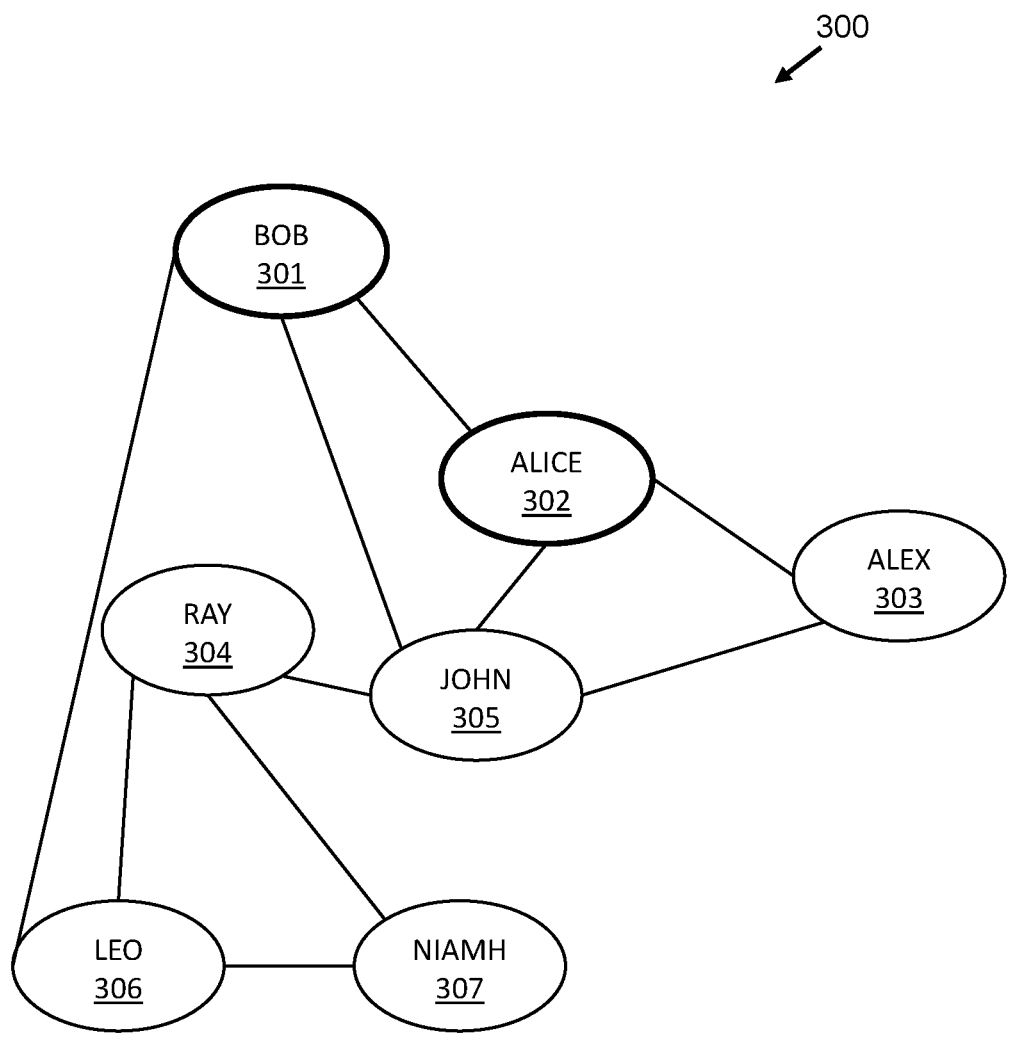
FIG. 3A is a schematic diagram illustrating one aspect of the described process according to at least one embodiment.
Figure 3B:
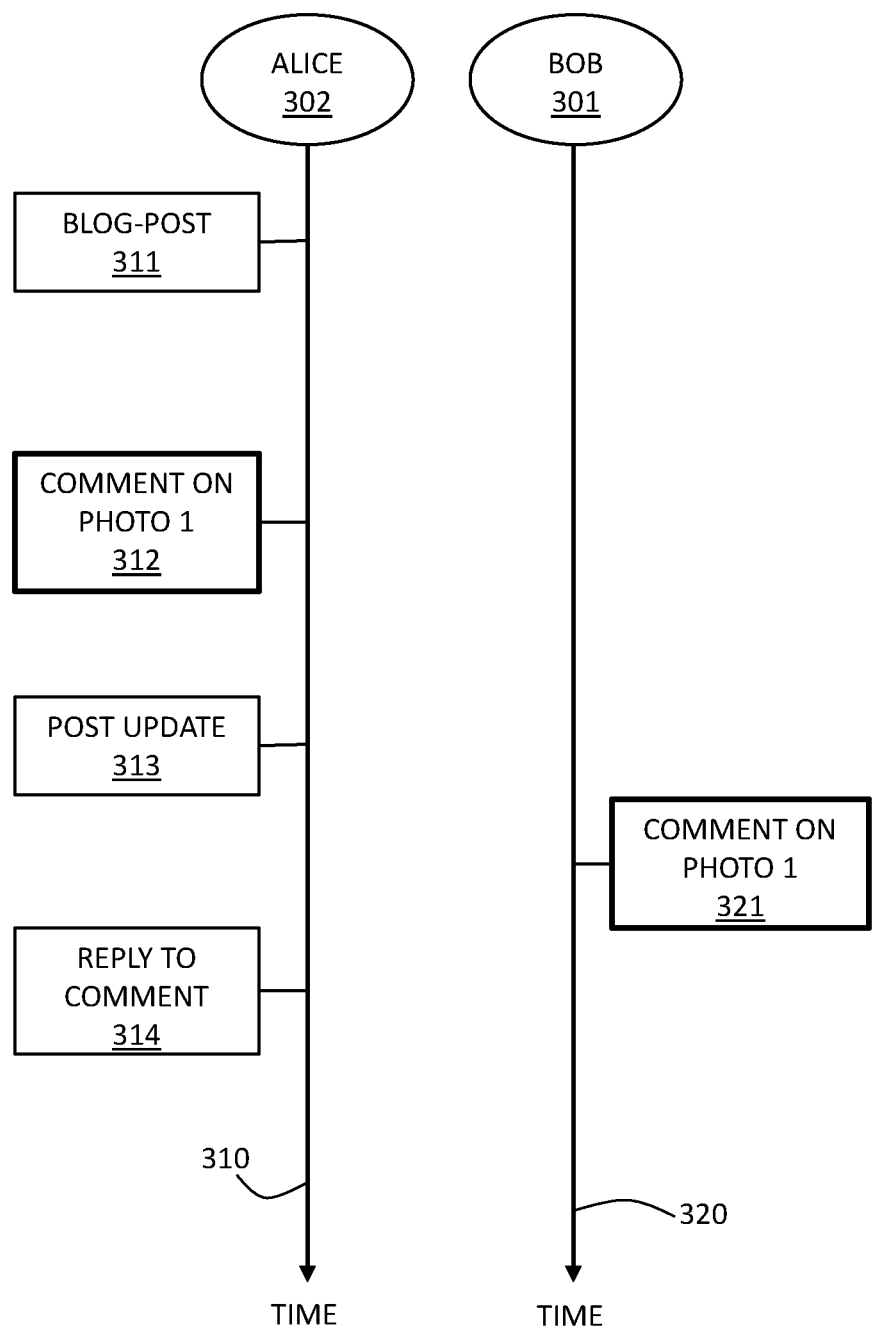
FIG. 3B is a schematic diagram illustrating another aspect of the described process according to at least one embodiment.
Figure 3C:
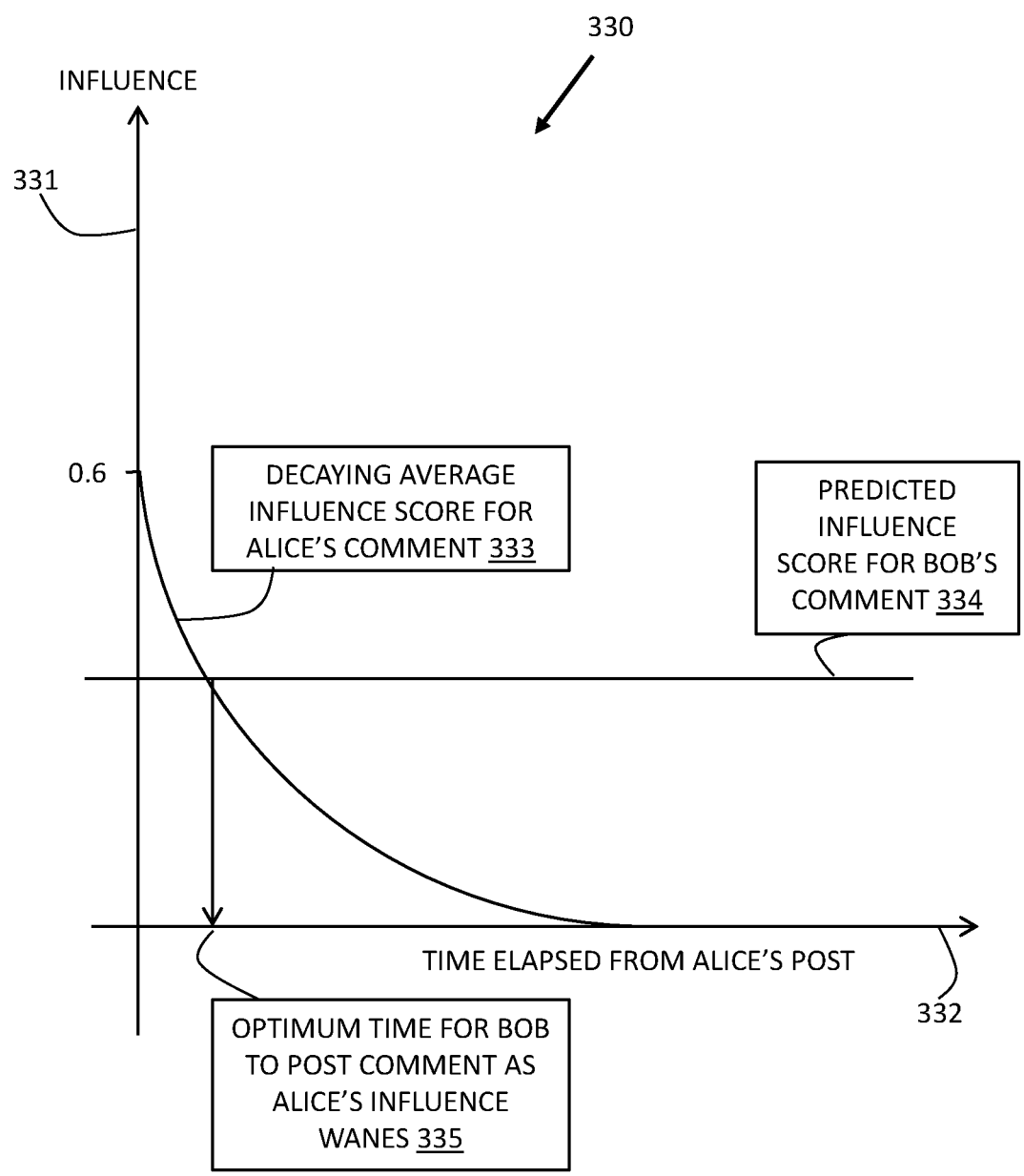
FIG. 3C is a schematic diagram illustrating a further aspect of the described process according to at least one embodiment.

Referring now to FIGS. 3A-3C, an example scenario according to at least one embodiment is depicted. In this example, a user Bob is attempting to post a movie review on the social media network but does not want a prior post by Alice to overshadow his post's influence.

FIG. 3A illustrates an exemplary social media network graph 300 of users 301-307 including Bob 301 and Alice 302.

Through propagation of actions, each action type can be associated with an average influence score for Alice and Bob as shown in Table 1 below.

TABLE 1

| ACTION TYPE | AVERAGE INFLUENCE SCORE FOR BOB | AVERAGE INFLUENCE SCORE FOR ALICE |
| --- | --- | --- |
| COMMENT ON POST | 0.8 | 0.6 |
| PUBLISH A BLOG | 0.5 | 0.8 |
| POST AN UPDATE | 0.4 | 0.5 |

These average influence scores may decay exponentially over time.

Referring to FIG. 3B, timelines 310 and 320 illustrates actions by Alice 302 and Bob 301, respectively. Alice 302 makes a blog post 311, followed by a comment on photo 1 312, followed by posting an update 313, and followed by replying to a comment 314. Bob 301 also wants to comment on the photo 1 321 but wants the influence of his action to have the maximum impact after the influence of Alice's comment on photo 1 312 has subsided.

Bob's proposed action 321 of posting a comment on photo 1 is determined by the system and a predicted influence score for Bob's proposed action (e.g., posting comment on photo 1) 321 is calculated. Alice's prior comment on photo 1 312 is identified as a prior related action and the time of Alice's comment is noted. Alice's average influence score for the action type of commenting on a post is obtained from the stored scores as 0.6.

A decay is applied to Alice's average influence score of 0.6 from the time of her comment 312 until a current time. Bob's comment 321 is posted at the time when the predicted score of Bob's comment 321 is greater than the decayed average influence score of Alice's comment 312.

Referring now to FIG. 3C, a graph 330 is depicted illustrating influence scores 331 against time elapsed 332 from Alice's comment 312. The predicted influence score 334 for Bob's proposed comment 321 is shown as a constant score. The average influence score of Alice's comment 312 is shown as an exponentially decaying graph 333 from the 0.6 score. The optimum time 335 for Bob to post his comment 321 is shown as the decaying average influence score 333 of Alice's comment 312 decreases below the predicted influence score of Bob's proposed comment 321.

Once the decaying average score drops to a value that is less than the predicted score, the system may perform the post on behalf of Bob.

The proposed method and system may provide an advantage for marketing products where influence maximization may help in increasing the customer engagement for a digital marketer.

The described method and system may also be implemented for chat-bots to increase the influence of chat-bot posts.

Figure 4:
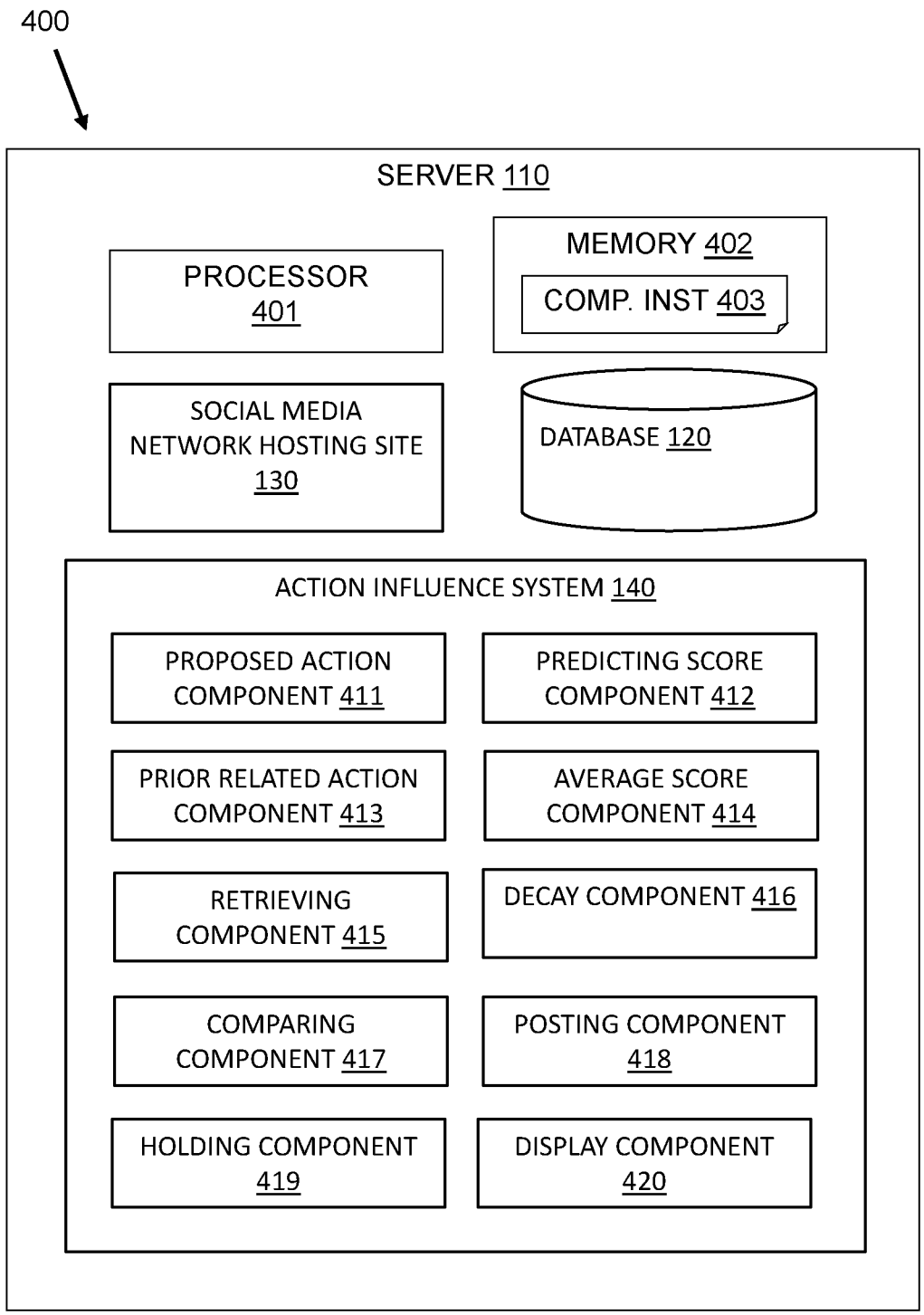
FIG. 4 is a block diagram of an exemplary embodiment of a system according to at least one embodiment.

Referring to FIG. 4, a block diagram 400 shows an example embodiment of the described system.

A server 110 may include at least one processor 401, a hardware module, or a circuit for executing the functions of the described components which may be software units executing on the at least one processor. Multiple processors running parallel processing threads may be provided enabling parallel processing of some or all of the functions of the components. Memory 402 may be configured to provide computer instructions 403 to the at least one processor 401 to carry out the functionality of the components. The server 110 may host a social media network hosting site 130 with an associated action influence system 140 providing the described functionality.

The server 110 may provide a social media network client application 170A, 170B for downloading onto client devices 160A, 160B to provide local functionality for the action influence system 140.

The action influence system 140 may include a proposed action component 411 for determining a proposed action by a user of a type of action and a predicting score component 412 for predicting a predicted influence score for the proposed action. The predicting score component 412 may use a model of influence propagation between users in the social media network based on learnt influence probabilities between users and may predict a predicted influence score for the user of the proposed action.

The action influence system 140 may include a prior related action component 413 for identifying a prior related action in the user's social media network including a type of the action, a user of the action, and a time of the action.

The action influence system 140 may include an average score component 414 for calculating and storing in a database 120 an average influence score for each user per action type based on the user's actions over a preconfigured period of time.

The action influence system 140 may include a retrieving component 415 for retrieving previously calculated average influence scores for the type and user of one or more prior related actions and a decay component 416 for applying a decay profile to an average influence score from the time of the action to a current time.

The action influence system 140 may include a comparing component 417 for comparing the predicted influence score with the one or more decayed average influence scores at the current time. The action influence system 140 may include a posting component 418 for posting the proposed action on the social media network at a time when the predicted influence score is greater than the one or more decayed average influence scores, and a holding component 419 for holding the proposed action before posting if the predicted influence score is less than the one or more decaying average influence scores and continually comparing the predicted influence score with the decaying average influence scores in real time.

The action influence system 140 may include a display component 420 for displaying a predicted influence score of a proposed action and the decaying average influence scores of prior related actions to a user making the proposed action.

Figure 5:
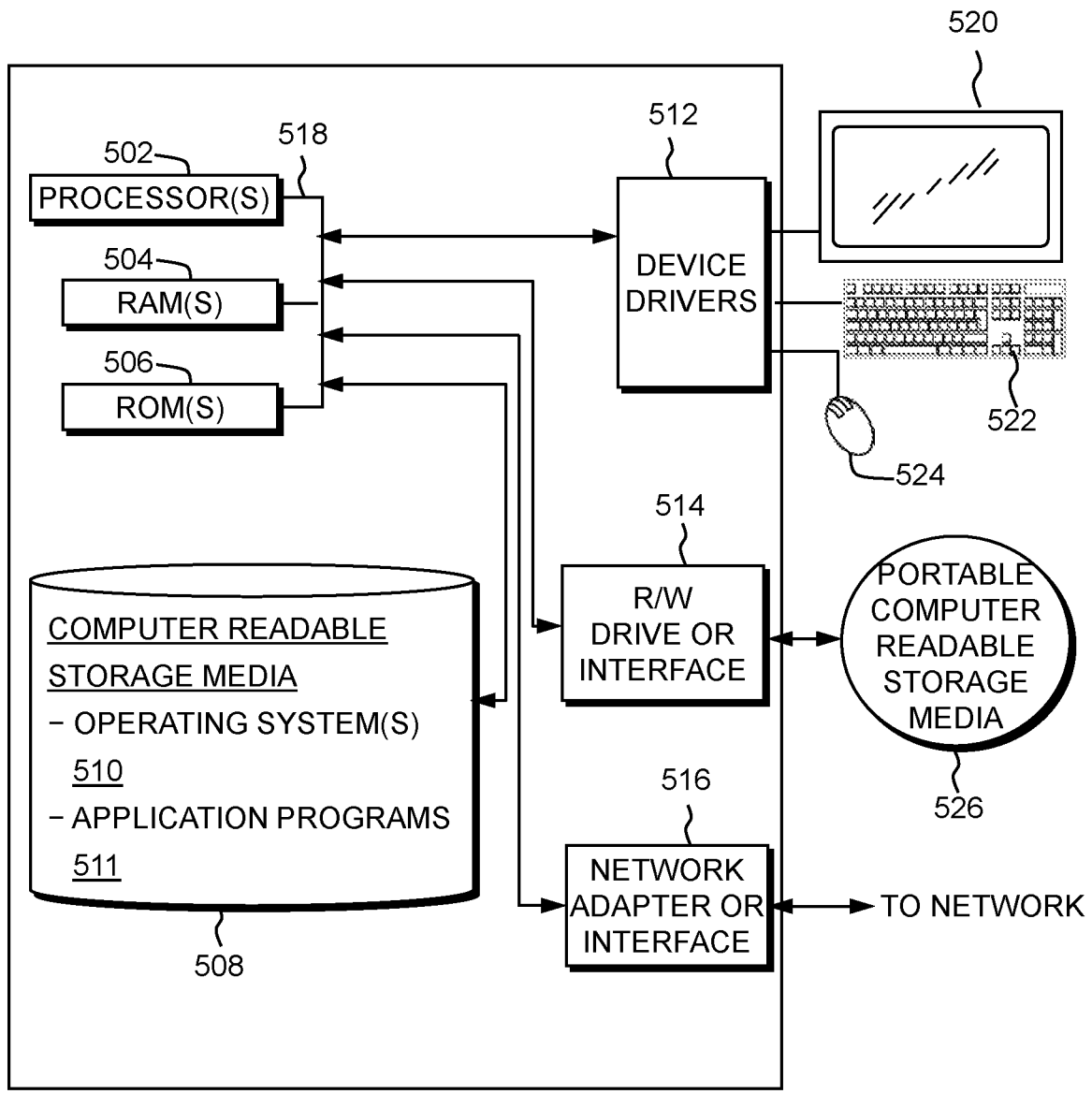
FIG. 5 is a block diagram of internal and external components of a computer system or cloud server according to at least one embodiment.

FIG. 5 depicts a block diagram of components of the computing device of a server 110 or client device 160A, 160B of FIG. 1, in accordance with an embodiment of the present invention. It should be appreciated that FIG. 5 provides only an illustration of one implementation and does not imply any limitations with regard to the environments in which different embodiments may be implemented. Many modifications to the depicted environment may be made.

Computing device can include one or more processors 502, one or more computer-readable RAMs 504, one or more computer-readable ROMs 506, one or more computer readable storage media 508, device drivers 512, read/write drive or interface 514, and network adapter or interface 516, all interconnected over a communications fabric 518. Communications fabric 518 can be implemented with any architecture designed for passing data and/or control information between processors (such as microprocessors, communications and network processors, etc.), system memory, peripheral devices, and any other hardware components within the system.

One or more operating systems 510, and application programs 511, such as an action influence system 140 and client action influence systems 180A, 180B, are stored on one or more of the computer readable storage media 508 for execution by one or more of the processors 502 via one or more of the respective RAMs 504 (which typically include cache memory). In the illustrated embodiment, each of the computer readable storage media 508 can be a magnetic disk storage device of an internal hard drive, CD-ROM, DVD, memory stick, magnetic tape, magnetic disk, optical disk, a semiconductor storage device such as RAM, ROM, EPROM, flash memory, or any other computer readable storage media that can store a computer program and digital information, in accordance with embodiments of the invention.

Computing device can also include a R/W drive or interface 514 to read from and write to one or more portable computer readable storage media 526. Application programs 511 on computing device 110 can be stored on one or more of the portable computer readable storage media 526, read via the respective R/W drive or interface 514 and loaded into the respective computer readable storage media 508.

Computing device can also include a network adapter or interface 516, such as a TCP/IP adapter card or wireless communication adapter. Application programs 511 on computing device 110 can be downloaded to the computing device from an external computer or external storage device via a network (for example, the Internet, a local area network or other wide area networks or wireless networks) and network adapter or interface 516. From the network adapter or interface 516, the programs may be loaded into the computer readable storage media 508. The network may comprise copper wires, optical fibers, wireless transmission, routers, firewalls, switches, gateway computers and edge servers.

Computing device can also include a display screen 520, a keyboard or keypad 522, and a computer mouse or touchpad 524. Device drivers 512 interface to display screen 520 for imaging, to keyboard or keypad 522, to computer mouse or touchpad 524, and/or to display screen 520 for pressure sensing of alphanumeric character entry and user selections. The device drivers 512, R/W drive or interface 514, and network adapter or interface 516 can comprise hardware and software stored in computer readable storage media 508 and/or ROM 506.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
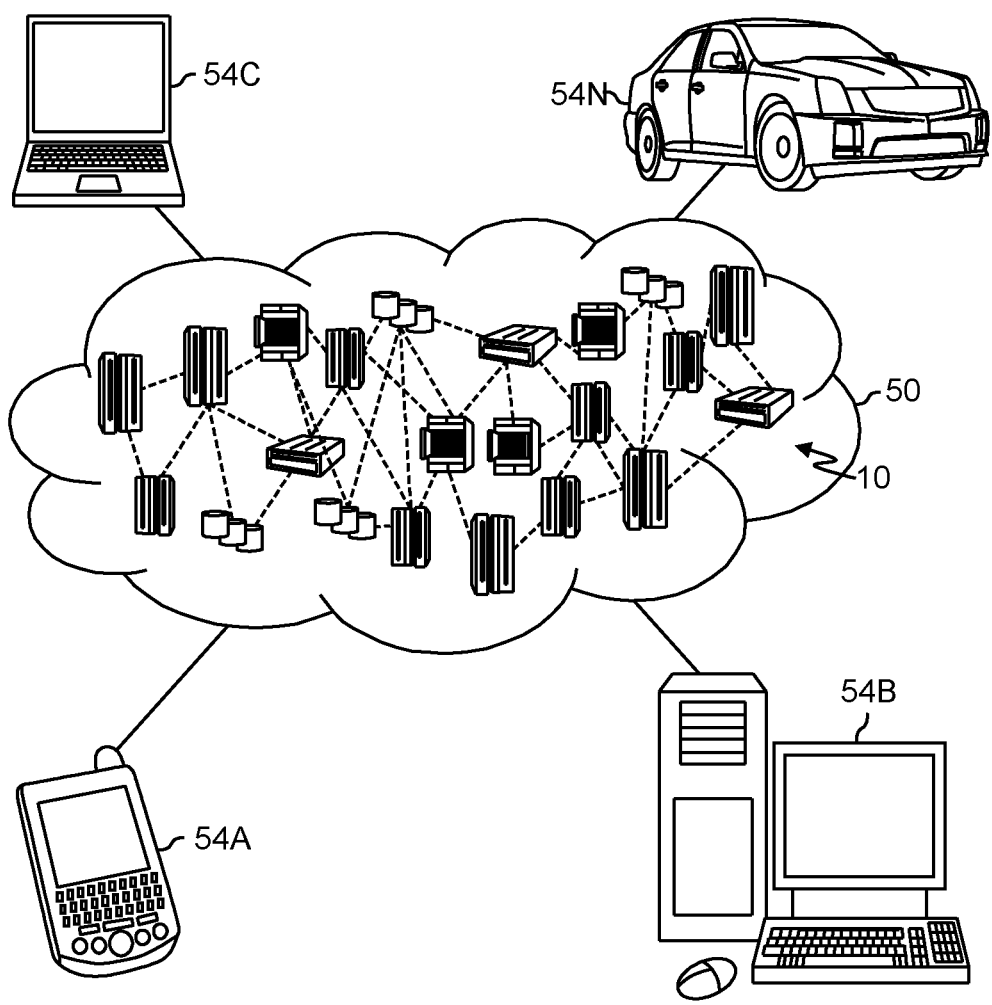
FIG. 6 is a block diagram of an illustrative cloud computing environment including the system depicted in FIG. 1, in accordance with an embodiment of the present disclosure.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
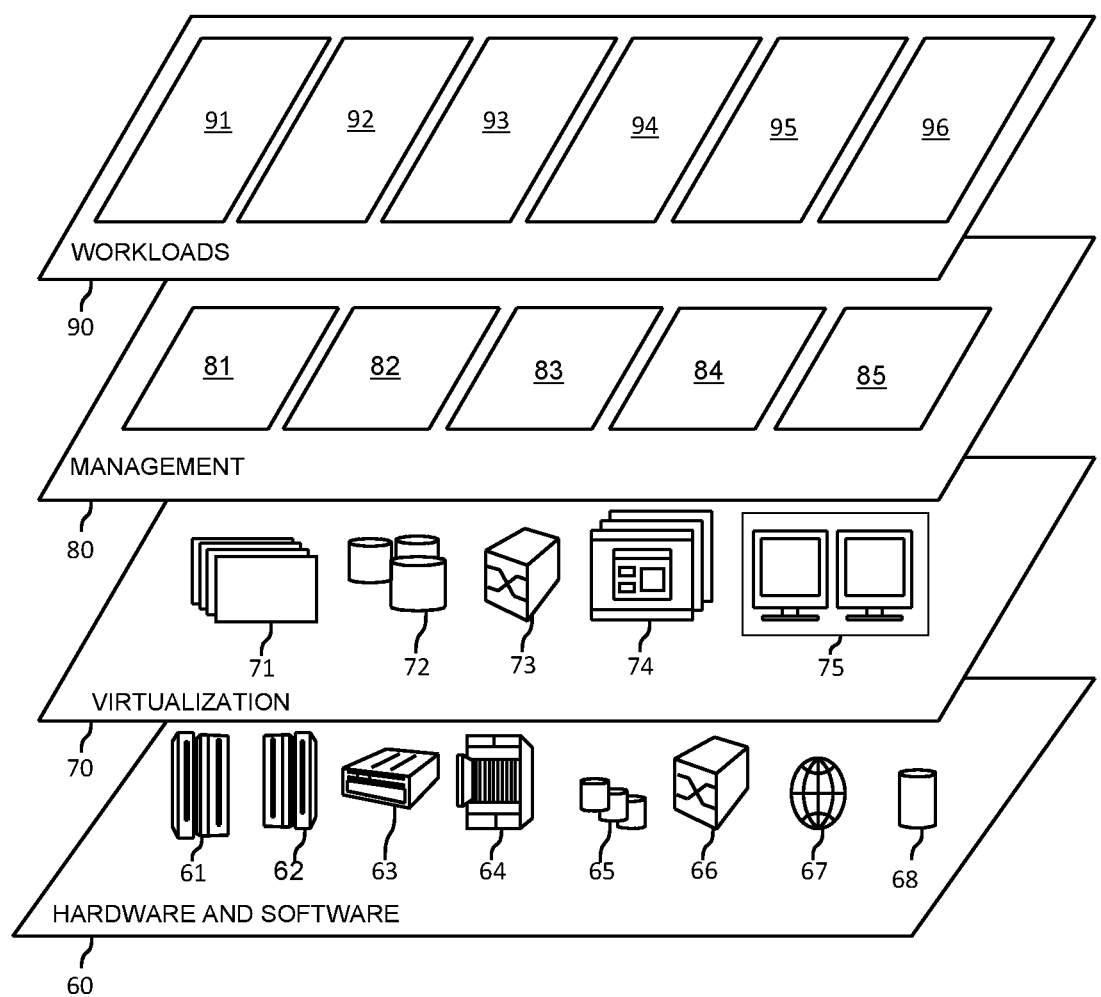
FIG. 7 is a block diagram of functional layers of the illustrative cloud computing environment of FIG. 6, in accordance with an embodiment of the present disclosure.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and social media network influence processing 96.

Improvements and modifications can be made to the foregoing without departing from the scope of the present invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for improving an influence of a social media network actbn, the method comprising:

determining a proposed action by a user of a social media network;

predicting an influence score for the determined proposed action by the user;

identifying a prior related action in the social media network of the user, wherein the identified prior related action includes identifying an action type of the identified prior related action, identifying a prior user associated with the identified prior related action, and identifying a performance time associated with the identified prior related action;

calculating an average influence score associated with the identified prior user and the identified action type performed over a preconfigured period of time, wherein the identified prior user prior user is a contact of the user, wherein the calculated average influence score implements a statistic selected fromthe group consisting of: a number of times the identified action type or a derivative of the identified action type is performed by at least one contact of the user after a performance of an action by the user, a performance frequency of the identified action type or the derivative of the identified action type by the at least one contact of the user, at least one influence score for the identified action type or the derivative of the identified action type performed by the at least one contact of the user, and a time that a subsequent action type or a subsequent derivative action type is performed by the at least one contact of the user after an initial performance of the action by the user;

storing the calculated average influence score associated with the identified prior user and the identified action type performed over the preconfigured period of time;

retrieving a calculated average influence score associated with the identified action type and the identified prior user of the identified prior related action;

applying a decay to the retrieved calculated average influence score from the identified performance time of the identified prior related action to a current time;

comparing the predicted influence score for the determined proposed action by the user against the decayed average influence score associated with the identified prior related action at the current time;

in response to determining that the predicted influence score for the determined proposed action by the user is greater than the decayed average influence score associated with the identified prior related action at the current time, posting the determined proposed action by the user on the social media network; and in response to determining that the predicted influence score for the determined proposed action by the user is less than the decayed average influence score associated with the identified prior related action at the current time, holding the determined proposed action by the user and continuously comparing, in real time, the predicted influence score for the determined proposed action by the user against a further decayed average influence score associated with the identified prior related action, wherein the further decayed average influence score is calculated based on continuously monitoring an influence of the identified prior related action until the further decayed average influence score is less than the predicted influence score forthe determined proposed action by the user.

2. The method of claim 1, wherein the identified action type of the identified prior related action is selected from the group consisting of: a same action type as the determined proposed action by the user and a related action type as the determined proposed action by the user.

3. The method of claim 1, wherein predicting the influence score for the determined proposed action by the user further comprises implementing a model of influence propagation between a plurality of users in the social media network based on at least one learned influence probability between the plurality of users in the social media network.

4. The method of claim 1, further comprising:

comparing the predicted influence score for the determined proposed action by the user against a plurality of decayed average influence scores associated with a plurality of identified prior related actions at the current time; and in response to determining that the predicted influence score for the determined proposed action by the user is greater than all of the plurality of decayed average influence scores associated with the plurality of identified prior related actions at the current time, posting the determined proposed action by the user on the social media network.

5. The method of claim 1, wherein applying the decay to the retrieved calculated average influence score from the identified performance time of the identified prior related action to the current time further comprises applying an exponential decay profile.

6. The method of claim 1, wherein retrieving the calculated average influence score associated with the identified action type and the identified prior user of the identified prior related action further comprises accessing a database including a plurality of calculated average influence scores associated with a plurality of prior users and a plurality of action types.

7. The method of claim 1, further comprising:

displaying, for the user, the predicted influence score for the determined proposed action by the user; and displaying, for the user, the decayed average influence score associated with the identified prior related action at the current time.

8. A computer system for improving an influence of a social media network action, comprising:

one or more processors, one or more computer-readable memories, one or more computer-readable tangible storage media, and program instructions stored on at least one of the one or more computer-readable tangible storage media for execution by at least one of the one or more processors via at least one of the one or more memories, wherein the computer system is capable of performing a method comprising:

determining a proposed action by a user of a social media network;

predicting an influence score for the determined proposed action by the user;

identifying a prior related action in the social media network of the user, wherein the identified prior related action includes identifying an action type of the identified prior related action, identifying a prior user associated with the identified prior related action, and identifying a performance time associated with the identified prior related action;

calculating an average influence score associated with the identified prior user and the identified action type performed over a preconfigured period of time, wherein the identified prior user prior user is a contact of the user, wherein the calculated average influence score implements a statistic selected from the group consisting of: a number of times the identified action type or a derivative of the identified action type is performed by at least one contact of the user after a performance of an action by the user, a performance frequency of the identified action type or the derivative of the identified action type by the at least one contact of the user, at least one influence score for the identified action type or the derivative of the identified action type performed by the at least one contact of the user, and a time that a subsequent action type or a subsequent derivative action type is performed by the at least one contact of the user after an initial performance of the action by the user;

storing the calculated average influence score associated with the identified prior user and the identified action type performed over the preconfigured period of time;

retieving a calculated average influence score associated with the identified action type and the identified prior user of the identified prior related action;

applying a decay to the retrieved calculated average influence score from the identified performance time of the identified prior related action to a current time;

comparing the predicted influence score for the determined proposed action by the user against the decayed average influence score associated with the identified prior related action at the current time;

in response to determining that the predicted influence score for the determined proposed action by the user is greater than the decayed average influence score associated with the identified prior related action at the current time, posting the determined proposed action by the user on the social media network; and in response to determining that the predicted influence score for the determined proposed action by the user is less than the decayed average influence score associated with the identified prior related action at the current time, holding the determined proposed action by the user and continuously comparing, in real time, the predicted influence score for the determined proposed action by the user against a further decayed average influence score associated with the identified prior related action, wherein the further decayed average influence score is calculated based on continuously monitoring an influence of the identified prior related action until the further decayed average influence score is less than the predicted influence score for the determlned proposed action by the user.

9. The computer system of claim 8, wherein predicting the influence score for the determined proposed action by the user further comprises implementing a model of influence propagation between a plurality of users in the social media network based on at least one learned influence probability between the plurality of users in the social media network.

10. The computer system of claim 8, further comprising:
displaying to the user, using a displaying component, the predicted influence score for the determined proposed action by the user; and
displaying to the user, using the displaying component, the decayed average influence score associated with the identified prior related action at the current time.

11. The computer system of claim 8, further comprising:
storing, in a database including a plurality of calculated average influence scores associated with a plurality of prior users and a plurality of action types, the calculated average influence score associated with the identified action type and the identified prior user of the identified prior related action.

12. The computer system of claim 8, further comprising:
providing an extended functionality to a social media network platform including providing an application running on client device, wherein the provided application is configured to provide at least one functionality for at least one component running on the client device.

13. A computer program product for improving an influence of a social media network action comprising:
one or more computer-readable non-transitory tangible storage media and program instructions stored on at least one of the one or more computer-readable non-transitory tangible storage media, the program instructions executable by a processor to cause the processor to perform a method comprising:

determining a proposed action by a user of a social media network;

predicting an influence score for the determined proposed action by the user;

identifying a prior related action in the social media network of the user, wherein the identified prior related action includes identifying an action type of the identified prior related action, identifying a prior user associated with the identified prior related action, and identifying a performance time associated with the identified prior related action;

calculating an average influence score associated with the identified prior user and the identified action type performed over a preconfigured period of time, wherein the identified prior user prior user is a contact of the user, wherein the calculated average influence score implements a statistic selected fromthe group consisting of: a number of times the identified action type or a derivative of the identified action type is performed by at least one contact of the user after a performance of an action by the user, a performance frequency of the identified action type or the derivative of the identified action type by the at least one contact of the user, at least one influence score for the identified action type or the derivative of the identified action type performed by the at least one contact of the user, and a time that a subsequent action type or a subsequent derivative action type is performed by the at least one contact of the user after an initial performance of the action by the user;

storing the calculated average influence score associated with the identified prior user and the identified action type performed over the preconfigured period of time;

retrieving a calculated average influence score associated with the identified action type and the identified prior user of the identified prior related action;

applying a decay to the retrieved calculated average influence score from the identified performance time of the identified prior related action to a current time;

comparing the predicted influence score for the determined proposed action by the user against the decayed average influence score associated with the identified prior related action at the current time;

in response to determining that the predicted influence score for the determined proposed action by the user is greater than the decayed average influence score associated with the identified prior related action at the current time, posting the determined proposed action by the user on the social media network; and in response to determining that the predicted influe.nce score for the determined proposed action by the user is less than the decayed average influence score associated with the identified prior related action at the current time, holding the determined proposed action by the user and continuously comparing, in real time, the predicted influence score for the determined proposed action by the user against a further decayed average influence score associated with the identified prior related action, wherein the further decayed average influence score is calculated based on continuously monitoring an influence of the identified prior related action until the further decayed average influence score is less than the predicted influence score forthe determined proposed action by the user.

* * * * *